United States Patent [19]

Kozub

[11] Patent Number: 4,942,717

[45] Date of Patent: Jul. 24, 1990

[54] PROCESS FOR THE PREPARATION OF STERILIZED PLANT MATTER

[76] Inventor: George Kozub, P.O. Box 280, Smoky Lake, Alberta, Canada

[21] Appl. No.: 224,580

[22] Filed: Jul. 26, 1988

[51] Int. Cl.$^5$ .................. B65B 1/24; B65B 31/06; B65B 55/14

[52] U.S. Cl. .................. 53/428; 53/425; 53/434; 53/436; 53/440; 56/16.4; 56/16.6; 241/10; 241/81

[58] Field of Search .................. 56/1, 16.4, 16.6; 53/121, 122, 407, 425, 428, 432, 434, 435, 436, 440; 241/10, 81; 422/26, 32

[56] References Cited

U.S. PATENT DOCUMENTS

| | | | |
|---|---|---|---|
| 2,651,269 | 9/1953 | French | 56/1 |
| 3,040,882 | 6/1962 | Beckum et al. | 53/436 X |
| 3,316,694 | 5/1967 | McColly et al. | 56/1 |
| 3,352,229 | 11/1967 | Morse | 56/1 |
| 3,524,594 | 8/1970 | Anderson et al. | 53/428 |
| 3,584,428 | 6/1971 | Falk | 53/434 |
| 3,721,527 | 3/1973 | Lodige et al. | 422/26 |
| 3,818,955 | 6/1974 | Kline | 53/432 X |
| 4,062,646 | 12/1977 | Lodige et al. | 422/32 X |
| 4,240,588 | 12/1980 | Fulghum, Jr. | 241/81 X |
| 4,272,946 | 6/1981 | Maher et al. | 56/16.6 X |

FOREIGN PATENT DOCUMENTS 47281 7/1984 Canada .................. 99/27

Primary Examiner—Robert L. Spruill

[57] ABSTRACT

A process for the preparation of sterilized plant matter consisting of the steps of; treating coarse chopped plant matter with heat to achieve dehydration, compression filling airtight fiber reinforced plastic bags with dehydrated plant matter, injecting high pressure steam into the dehydrated plant matter while in the bag and sealing the bag. A product consisting of steam sterilized coarse chopped plant matter under vacuum in air tight fiber reinforced plastic bags.

16 Claims, 1 Drawing Sheet

PROCESS FOR THE PREPARATION OF STERILIZED PLANT MATTER

The present invention relates to a process for the preparation of sterilized plant matter.

BACKGROUND OF THE INVENTION

For some applications, such as supplying foreign markets, plant matter, such as animal fodder or horticultural peat moss, must be sterilized. The sterilization is intended to suspend germination and kill foreign organisms. At the present time such sterilization is accomplished through the use of a combination of several chemicals. These chemicals have a number of disadvantages. The chemicals are poisonous and precautions must be taken to protect the workers who apply the chemicals. If the chemicals are not of sufficient toxicity germination will not be suspended and all foreign organisms will not be killed, resulting in the plant matter being contaminated due to germination or the growth of the organisms during shipment. If the chemicals are too toxic, the product will no longer be suitable for its intended purpose when received. Regardless of the care that is taken, there is a residue of the poison left in the plant matter when the sterilization process is completed.

SUMMARY OF THE INVENTION

What is required is a process for the preparation of sterilized plant matter which does not require the use of poisonous chemicals.

According to one aspect of the invention there is provided a process for the preparation of sterilized plant matter which is comprised of the steps of treating coarse chopped plant matter with heat to achieve dehydration, compression filling airtight fiber reinforced plastic bags with dehydrated plant matter, injecting high pressure steam into the plant matter while in the bag and sealing the bag.

Although beneficial results may be obtained by use of the process described the plant matter in bulk form can be unwieldy. Even more beneficial results may therefore be obtained if the plant matter, after dehydration, is pelletized before bagging.

Although beneficial results may be obtained by use of the process described, some coarse particles inevitably become intermixed with the plant matter. Even more beneficial results may therefore be obtained if these coarser particles are separated from the dehydrated plant matter, processed through a hammer mill and rejoined to the dehydrated plant matter.

Although beneficial results may be obtained by use of the process described, plant matter with excessive moisture content will rot and plant matter with insufficient moisture content will be of inferior quality. Even more beneficial results may therefore be obtained if the moisture content of the plant matter is closely controlled at the dehydration and bagging stages. It has been found to be particularly beneficial if the moisture content of peat moss is maintained at 40-50% after the dehydration step and 65-75% in the sealed bag. It has been found to be particularly beneficial if the moisture level of fodder is 7-15% after the dehydration step and 18-20% for hay and 7-15% for straw in the sealed bag.

According to another aspect of the invention there is provided a product comprising steam sterilized coarse chopped plant matter under vacuum in air tight fiber reinforced plastic bags.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
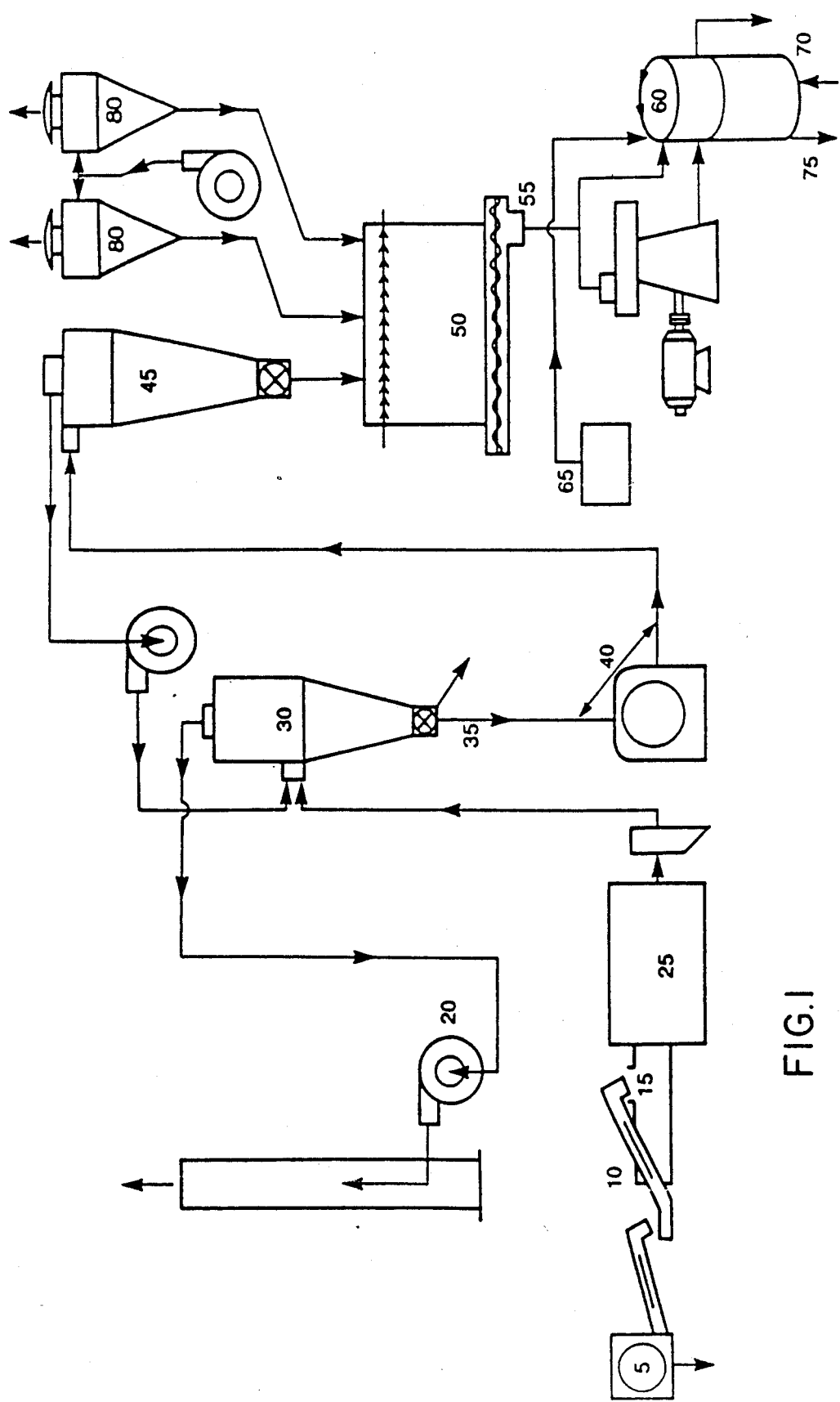
FIG. 1 is a product flow diagram of a preferred process.

The preferred process for the preparation of sterilized plant matter will now be described with reference to FIG. 1.

The process as described has its primary application to horticultural peat moss and animal fodder, such as forage, straw, hay, alfalfa, Timothy, Orchard grass, and Kentucky Blue grass. The process can be used for other types of plant matter which must be sterilized for purposes of export or other reasons. Although the moisture content of coarse chopped animal forages feeds and horticulture peat moss may vary; the production flow chart remains the same and is adjusted accordingly as required.

The first step in the process involves dehydration of the plant matter. Referring to FIG. 1, course chopped plant matter is deposited into a Hydraulic Truck dump 5. From hydraulic truck dump 5 the plant matter is transferred by dry conveyor to a Feeder 10. Forage feeder 10 directs the plant matter through an opening on top of a brick lined burner 12 ft. long 4 ft. diameter of Dehydrator drum 25. Gas flame burners 15 are located at the opposite end of the brick lined burner where the materials drop in. Gas flame burners 15 produce and blow hot 750 degree burning gases for fourteen feet, through the 4 foot diameter and 12 foot length of the brick lined burner into a triple pass Dehydrator Drum 25. The hot gases, combined with the suction force of a 100 Horse power Fan 20 and the direction of the flame from gas flame burners 15; force the plant matter through dehydrator 25 in a matter of 45 seconds to 3 minutes, depending on the governed moisture temperature of 750 degrees F to 220 degrees F at the discharge into a dehydrator 25. The dehydrator 25 is capable of evaporation 24,000 lbs. of water an hour with a starting temperature of 750 degrees F. The optimum moisture content at the dehydration step of the process varies with the type of plant matter. Too high a moisture content results in rotting of the plant matter. Too low a moisture content results in the plant matter becoming dusty or losing it's moisture absorbing ability. It has been found that moisture content of the chopped fodder, such as forage, straw, or hay, should be reduced to 7 to 15% at discharge of dehydrator 25. In the case of peat moss, the moisture content is reduced to 40 to 50%.

The second step in the process involves the separation of coarse particles. Referring to FIG. 1, as plant matter is discharged from dehydrator 25 it is lifted by suction and dropped into the top of a Vacollector cyclone 30. The action of the vortex then draws the plant matter into a rotary air lock 35 at the bottom of cyclone 30. Modified Screens incorporate a magnetic separator to remove ferrous materials from the process stream. The modified screens allow only the coarse materials to flow to the hammer mill 40. Bypass hammer mill 40 reduces the size of coarse materials such as roots and sticks. The plant matter is then lifted into a product collector cyclone 45 which has a rotary air lock. The plant material then passes through rotary air lock into a mill bin 50 which has a mill bin discharge screw 55. The plant matter at this stage are still warm. Two cooler cyclones 80 draw off exhaust air and gases from mill bin 50 to control dust formation.

The third step in the process is the bagging of the dehydrated plant matter. Referring to FIG. 1, the warm dehydrated plant matter is fed into mill bin discharge screw 55 then into bypass cut off to feed either pellet mill or a multi-stage verville bagging compressor 60. The bypass cut off permits an optional fourth step of pelletizing the plant matter to be performed prior to bagging. The compression on compressor 60 may be adjusted to suit the bagging application. Fiberate reinforced air-tight plastic are placed open mouthed in compressor 60 at position 70 to be filled. The bags are fiberate to ensure that they have sufficient strength to withstand steam injection and confine the plant material without the necessity of using straps or another form of binder.

The fifth step in the process is the injection of steam. Steam is injected from high pressure boiler 65 into the dehydrated plant material while it is in the bag and still warm from the heat treatment.

In the sixth step in the process the filled bags are sealed and discharged at position 75 of compressor 60. The filled compressed air-tight fibre reinforced bags discharged at position 75 are sealed immediately on discharge, by an air-tight seam. The moisture content at the bagging stage is closely controlled for reasons previously stated. It has been found that the optimum moisture content for bagging and storage of hay is 18% to 20%. The moisture content of fodder, such as forage, hay, and straw, is controlled by injection of high pressure steam at 18 to 20% moisture. The bags are filled and sealed, excluding air, thus within desired storage limits. The moisture content in Horticultural peat at filling and sealing of bags is maintained and controlled at 65 to 75% moisture content by the injection of high pressure steam.

The heat and steam incorporated into the chopped fodder, such as forage, hay, or straw, compressed in a closed air tight reinforced fiber woven plastic package is locked in, and being an insulating material cools very slowly providing heat and steam exposure for a prolonged time. The forage hay straw contents of the vacuum are tightly compressed without requiring any binders in strong fiber woven reinforced air-tight plastic bag, compressed for an example a ratio of 100 lbs contents into a 4 cubic foot air-tight square edge corner bags. Providing ease of handling and storage at all times, without the need of storage buildings or tarpaulin coverage. A real convenience for the race horse and live stock owners out supply of quality control sterilized forage hay straw, without poisonous toxic contamination. The heat-steam compressed 2 inch chopped forage, straw, hay, and peat moss in air-tight bales, are held in shape by the strength of fibrated air-tight plastic bags.

The moisture content of the peat moss product entering compression tubes with steam is controlled at 40-60%. The open mouth of the bag is folded over and sealed airtight. The heat-steam cools slowly in the airtight peat moss package. The condensing steam is absorbed by the peat moss in the air-tight bag, keeping the waxes of the peat moss moist and soft, and the cells opened and expanded causing a vacuum to be formed, providing more moisture holding capacity of the horticulture peat moss in comparison to overdried shrivelled, wax, peat moss cells with a lower moisture content. The heat-steam sterilizing packaging of horticulture peat moss process is identical to sterilizing packaging process used in this application for animal fodder. The same equipment is used, with exception of moisture variation.

The embodiments of the invention in which an exclusive property or privilege is claimed are defined as follows:

1. A process for the preparation of sterilized plant matter comprising the steps of:
   a. treating coarse chopped plant matter with heat to achieve dehydration;
   b. compression filling airtight fiber reinforced plastic bags with the still heated dehydrated plant matter;
   c. injecting high pressure steam into the heated dehydrated plant matter while in the bag, the size of the bag being such that the high pressure steam can completely and sufficiently penetrate through the heated dehydrated plant matter to attain temperatures sufficient to achieve sterilization; and
   d. sealing the bag whereby the temperatures in the bag are maintained for sufficient time duration to achieve sterilization, and condensing steam is absorbed by the dehydrated plant matter to create vacuum conditions in the bag.

2. A process as defined in claim 1, the plant matter being animal fodder.

3. A process as defined in claim 1, the plant matter being horticultural peat moss.

4. A process as defined in claim 2, the fodder being forage.

5. A process as defined in claim 2, the fodder being straw.

6. A process as defined in claim 2, the fodder being hay.

7. A process as defined in claim 2, the fodder being alfalfa.

8. A process as defined in claim 2, the fodder being Timothy.

9. A process as defined in claim 2, the fodder being Kentucky Blue Grass.

10. A process as defined in claim 1, including the further step of pelletizing the dehydrated plant matter after the dehydration step and before the bagging step.

11. A process as defined in claim 1, including the further steps of separating coarser particles from the dehydrated plant matter, processing the coarser particles through a hammer mill and rejoining the coarser particles with the dehydrated plant matter.

12. A process as defined in claim 2, the moisture content of the fodder being 7-15% after the dehydration step.

13. A process as defined in claim 3, the moisture of the moss being 40-50% after the dehydration step.

14. A process as defined in claim 6, the moisture content of the hay in the sealed bag being 18-20%.

15. A process as defined in claim 5, the moisture content of the straw in the sealed bag being 7-15%.

16. A process as defined in claim 3, the moisture content of the moss in the sealed bag being 65-75%.

* * * * *